US009014218B2

(12) United States Patent
Ozawa

(10) Patent No.: US 9,014,218 B2
(45) Date of Patent: Apr. 21, 2015

(54) SIGNAL TRANSMISSION SYSTEM, SIGNAL TRANSMISSION METHOD, TRANSMITTING DEVICE AND RECEIVING DEVICE

(75) Inventor: Masato Ozawa, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 245 days.

(21) Appl. No.: 13/408,403

(22) Filed: Feb. 29, 2012

(65) Prior Publication Data

US 2012/0243558 A1 Sep. 27, 2012

(30) Foreign Application Priority Data

Mar. 22, 2011 (JP) .................................. 2011-063340

(51) Int. Cl.
*H04J 3/04* (2006.01)
*H04L 5/16* (2006.01)
*G09G 5/00* (2006.01)
*H04L 25/02* (2006.01)
*H04L 27/10* (2006.01)

(52) U.S. Cl.
CPC ........ *H04L 5/16* (2013.01); *G09G 5/006* (2013.01); *G09G 2370/12* (2013.01); *H04L 25/0272* (2013.01); *H04L 27/10* (2013.01)

(58) Field of Classification Search
CPC ........... H04N 7/00; H04N 7/08; G09G 5/005; G09G 1/00; H04B 10/40; H04B 10/50; H04B 10/516; H04B 10/5161; H04B 10/548; H04J 9/00; H04J 1/08; H04J 3/04
USPC ......... 370/276, 277, 278, 279, 281, 282, 284, 370/295, 296, 305, 302–304, 307, 535, 536, 370/542; 725/109, 74, 71, 86, 97, 103, 105, 725/108, 111, 117, 118, 149, 153; 345/10, 345/667, 11, 127, 132, 168, 212, 213, 3, 12, 345/27

See application file for complete search history.

(56) References Cited

U.S. PATENT DOCUMENTS 5,457,473 A * 10/1995 Arai et al. ........................ 345/10
5,793,411 A * 8/1998 Hiraizumi ........................ 725/91
(Continued)

FOREIGN PATENT DOCUMENTS

JP 3-10491 1/1991
JP 5-219532 8/1993
(Continued)

OTHER PUBLICATIONS

Office Action issued by the Japanese Patent Office on Dec. 2, 2014 in the corresponding Japanese patent application No. 2011-063340.

*Primary Examiner* — Hanh N Nguyen
(74) *Attorney, Agent, or Firm* — Staas & Halsey LLP

(57) ABSTRACT

A signal transmission system including a transmitting device and a receiving device, including: the transmitting device including: a first modulator that modulates a frequency of a control signal; and a first multiplexer that multiplexes the frequency-modulated control signal onto a DVI (Digital Visual Interface) signal to be transmitted to the receiving device via a single network cable; and the receiving device including: a first separator that separates the frequency-modulated control signal from the multiplexed DVI signal; and a first demodulator that demodulates the separated control signal.

10 Claims, 10 Drawing Sheets

(56) References Cited

U.S. PATENT DOCUMENTS

| | | | |
|---|---|---|---|
| 6,304,236 B1 * | 10/2001 | Arai et al. | 345/10 |
| 7,379,121 B2 * | 5/2008 | Suzuki et al. | 348/723 |
| 7,844,292 B2 * | 11/2010 | Shamburger | 455/518 |
| 7,895,633 B2 * | 2/2011 | Van Hoff et al. | 725/109 |
| 2004/0252239 A1 | 12/2004 | Niiyama | |
| 2006/0098745 A1 * | 5/2006 | Chou et al. | 375/259 |
| 2007/0285582 A1 | 12/2007 | Hongo et al. | |
| 2011/0109600 A1 * | 5/2011 | Yamamoto et al. | 345/204 |
| 2011/0122147 A1 * | 5/2011 | Yasukawa et al. | 345/589 |

FOREIGN PATENT DOCUMENTS

| | | |
|---|---|---|
| JP | 9-54569 | 2/1997 |
| JP | 2004-48133 | 2/2004 |
| JP | 2004-356939 | 12/2004 |
| JP | 2007-300490 | 11/2007 |
| JP | 2008-131297 | 6/2008 |

* cited by examiner

FIG. 3

| ITEM | CONTENT |
|---|---|
| COMMUNICATION METHOD | HALF-DUPLEX COMMUNICATION METHOD |
| SYNCHRONOUS METHOD | START-STOP SYNCHRONOUS METHOD |
| MODULATION METHOD | FREQUENCY MODULATION METHOD |
| TRANSMISSION SPEED | 1200bps |
| LINE FREQUENCY | $F_Z$: 1300Hz (1, MARK)<br>$F_A$: 2100Hz (0, SPACE) |

US 9,014,218 B2

SIGNAL TRANSMISSION SYSTEM, SIGNAL TRANSMISSION METHOD, TRANSMITTING DEVICE AND RECEIVING DEVICE

CROSS-REFERENCE TO RELATED APPLICATION

This application is based upon and claims the benefit of priority of the prior Japanese Patent Application No. 2011-063340, filed on Mar. 22, 2011, the entire contents of which are incorporated herein by reference.

FIELD

A certain aspect of the embodiments discussed herein is related to a signal transmission system, a signal transmission method, a transmitting device and a receiving device.

BACKGROUND

Conventionally, there has been known a remote system in which a receiving device and a transmitting device are connected to each other via a Cat 5 (Category 5) cable, i.e., a LAN (Local Area Network) cable (See Japanese Laid-Open Patent Publication No. 2004-356939). In the remote system, the transmitting device transmits a video signal (an analog RGB signal) to the receiving device with three pairs of signal lines in the Cat 5 cable. In addition, the transmitting device transmits and receives a console signal such as a keyboard/mouse signal to/from the receiving device with a remaining pair of signal lines.

A remote system in which the single Cat 5 cable to be connected between the transmitting device and the receiving device is extended is required. In the required remote system, a DVI (Digital Visual Interface) signal and various control signals are transmitted from the transmitting device to the receiving device.

However, since the DVI signal is composed of four pairs of differential signals, all signal lines in the Cat 5 cable (i.e., four pairs of signal lines) are occupied by the DVI signal, and cannot transmit a control signal. Therefore, two Cat 5 cables are connected between the transmitting device and the receiving device, and the DVI signal and the control signal are transmitted via the different signal lines, respectively.

SUMMARY

According to an aspect of the present invention, there is provided a signal transmission system including a transmitting device and a receiving device, including: the transmitting device including: a first modulator that modulates a frequency of a control signal; and a first multiplexer that multiplexes the frequency-modulated control signal onto a DVI (Digital Visual Interface) signal to be transmitted to the receiving device via a single network cable; and the receiving device including: a first separator that separates the frequency-modulated control signal from the multiplexed DVI signal; and a first demodulator that demodulates the separated control signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of signal standards of a control signal and a response signal;

DESCRIPTION OF EMBODIMENTS

A description will now be given, with reference to the accompanying drawings, of an embodiment of the present invention.

Figure 1:
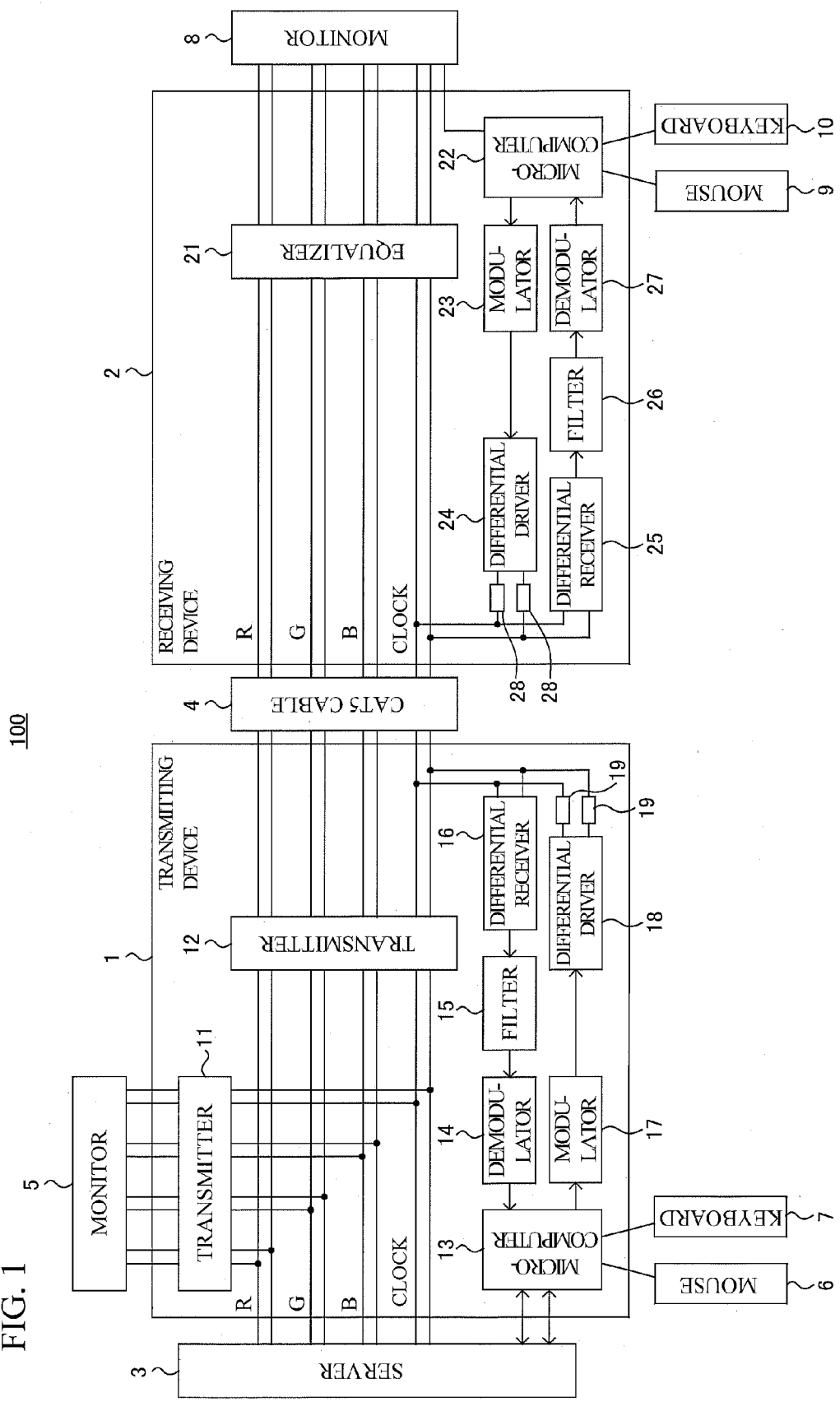
FIG. 1 is a schematic diagram illustrating the construction of a signal transmission system according to a first embodiment.

(First Embodiment) FIG. 1 is a schematic diagram illustrating the construction of a signal transmission system according to a first embodiment.

As illustrated in FIG. 1, a signal transmission system 100 includes a transmitting device 1, a receiving device 2, a server 3, a Cat5 (Category 5) cable 4 as a network cable, monitors 5 and 8, mouse devices 6 and 9, and keyboards 7 and 10. The Cat5 cable 4 is a so-called STP (Shielded Twisted Pair) cable, and includes four pairs of signal lines (i.e., eight signal lines). The transmitting device 1 is connected to the receiving device 2 via the Cat5 cable 4. In addition, the transmitting device 1 is connected to the server 3 and the monitor 5 via DVI (Digital Visual Interface) cables, and connected to the server 3 via a USB (Universal Serial Bus) cable. The receiving device 2 is connected to the monitor 5 via a DVI cable.

In the signal transmission system 100, a video from the server 3 is transmitted from the transmitting device 1 to the receiving device 2. A user near the transmitting device 1 can operate the server 3 or the receiving device 2 using the mouse 6 and the keyboard 7 while watching the monitor 5. On the contrary, a user near the receiving device 2 can operate the server 3 or the transmitting device 1 using the mouse 9 and the keyboard 10 while watching the monitor 8.

The transmitting device 1 includes transmitters 11 and 12, a microcomputer 13, a demodulator 14, a filter 15, a differential receiver 16, a modulator 17, a differential driver 18, and terminators 19. The transmitter 11 transmits a DVI signal output from the server 3, to the monitor 5. The modulator 17 functions as an example of a modulator and a first modulator. The differential driver 18 functions as an example of a multiplexer and a first multiplexer. The filter 15 functions as an example of a separator and a second separator. The demodulator 14 functions as an example of a demodulator and a second demodulator. The DVI signal is a differential signal, and is composed of a red signal, a green signal, a blue signal and a clock signal. A transmission channel of the DVI signal is composed of four twisted pair cables, and data of 24 bits per 1 pixel (i.e., full color data) is transmitted.

The transmitter 12 transmits the DVI signal output from the server 3 to the receiving device 2 the Cat5 cable 4. In addition, the transmitter 12 amplifies the DVI signal in consideration of attenuation of the DVI signal by the Cat5 cable 4. The microcomputer 13 transmits and receives a control signal and a response signal between the server 3 and the receiving device 2. Here, the control signal is a serial signal, and indicates a command, which is transmitted from the server, for detecting the malfunction of the monitor 8, or a command for adjusting luminance or resolution of the monitor 8. The response signal is a serial signal, and indicates a response form the monitor 8 to the control signal. The microcomputer 13 transmits data input from the mouse 6 or the keyboard 7 to the server 3 or the receiving device 2 as a signal.

The differential receiver 16 receives the clock signal onto which the response signal is multiplexed, from the receiving device 2. The frequency of the clock signal is 100-165 MHz, and the frequency of the response signal is about 2 kHz. The response signal is multiplexed to the clock signal as a modulation signal of a low frequency band. The filter 15 is a low pass filer and separates the response signal from the clock signal. The demodulator 14 demodulates the separated response signal, and outputs the demodulated response signal to the server 3 via the microcomputer 13. The modulator 17 modulates the frequency of the control signal from the server 3, and outputs the frequency-modulated control signal to the differential driver 18. The differential driver 18 multiplexes the frequency-modulated control signal onto the clock signal (i.e., performs frequency-division multiplexing), and transmits the multiplexed control signal to the receiving device 2. Each of the terminators 19 is composed of a resistance, prevents reflection of the control signal output from the differential driver 18, and hence prevents disorder of the signal.

The receiving device 2 includes an equalizer 21, a microcomputer 22, a modulator 23, a differential driver 24, a differential receiver 25, a filter 26, a demodulator 27, and terminators 28. The modulator 23 functions as an example of a modulator and a second modulator. The differential driver 24 functions as an example of a multiplexer and a second multiplexer. The filter 26 functions as an example of a separator and a first separator. The demodulator 27 functions as an example of a demodulator and a first demodulator.

The equalizer 21 compensates the loss (attenuation) of the DVI signal received from the transmitting device 1, and outputs the DVI signal to the monitor 8. The microcomputer 22 transmits and receives the control signal and the response signal between the monitor 8 and the transmitting device 1. The microcomputer 22 transmits data input from the mouse 9 or the keyboard 10 to the transmitting device 1 as a signal. The modulator 23 modulates the frequency of the response signal from the monitor 8, and outputs the frequency-modulated response signal to the differential driver 24. The differential driver 24 multiplexes the frequency-modulated response signal onto the clock signal (i.e., performs frequency-division multiplexing), and transmits the multiplexed response signal to the transmitting device 1. Each of the terminators 28 is composed of a resistance, prevents reflection of the response signal output from the differential driver 24, and hence prevents disorder of the signal.

The differential receiver 25 receives the clock signal onto which the control signal is multiplexed, from the transmitting device 1. The frequency of the clock signal is 100-165 MHz, and the frequency of the response signal is about 2 kHz. The control signal is multiplexed onto the clock signal as a modulation signal of a low frequency band. The filter 26 is a low pass filer and separates the control signal from the clock signal. The demodulator 27 demodulates the separated control signal, and outputs the demodulated control signal to the monitor 8 via the microcomputer 22.

Figure 2:
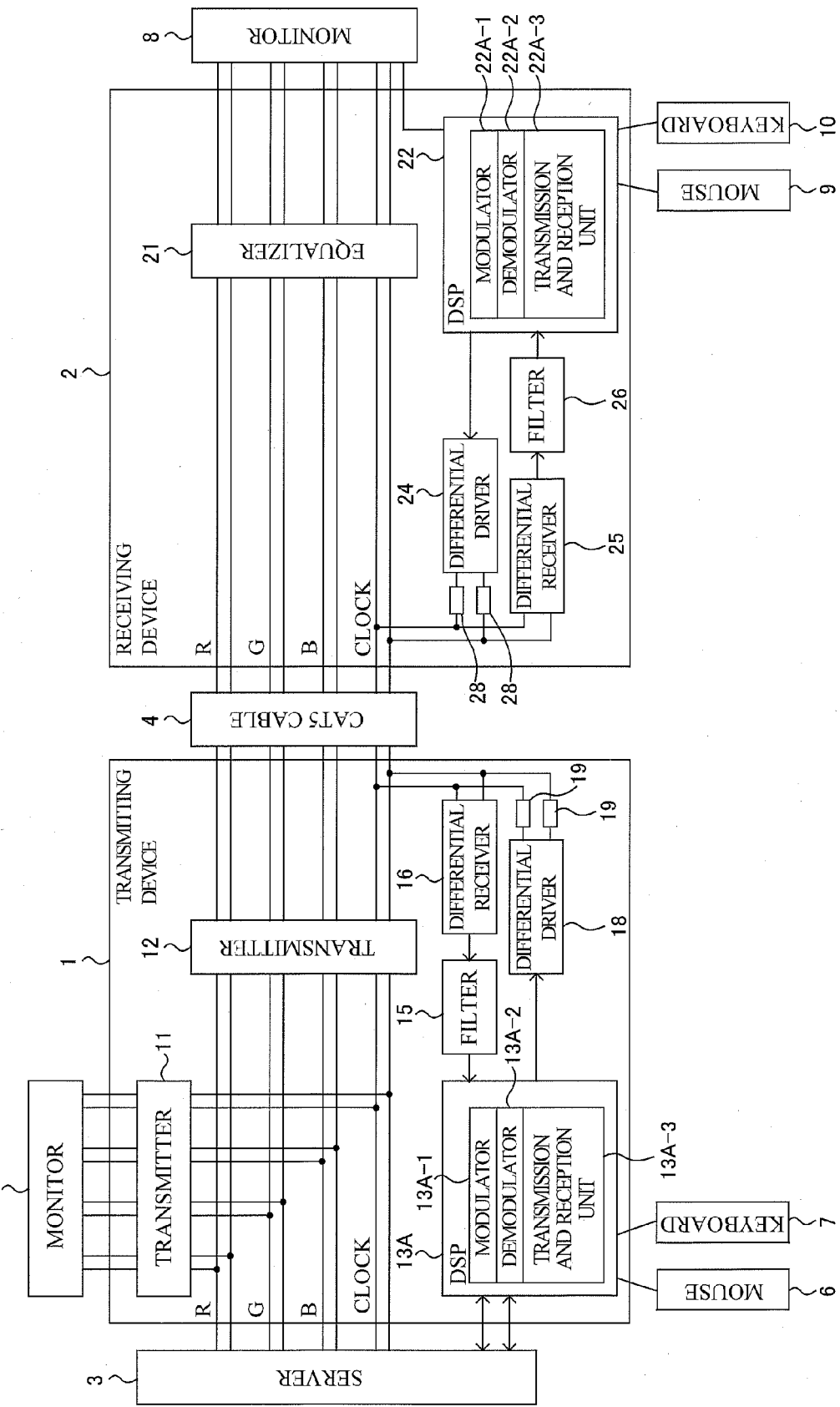
FIG. 2 is a diagram illustrating a variation of the schematic construction of the signal transmission system in FIG. 1.

As illustrated in FIG. 2, the microcomputer 13, the demodulator 14 and the modulator 17 of the transmitting device 1 may be replaced with a digital signal processor (DSP) 13A. Similarly, the microcomputer 22, the demodulator 27 and the modulator 23 of the receiving device 2 may be replaced with a digital signal processor (DSP) 22A. In this case, the DSP 13A includes a modulator 13A-1 that modulates the control signal, a demodulator 13A-2 that demodulates the response signal, and a transmission and reception unit 13A-3 that transmits and receives the control signal and the response signal. The DSP 22A includes a modulator 22A-1 that modulates the response signal, a demodulator 22A-2 that demodulates the control signal, and a transmission and reception unit 22A-3 that transmits and receives the control signal and the response signal. The modulator 13A-1 functions as an example of a modulator and a first modulator. The demodulator 13A-2 functions as an example of a demodulator and a second demodulator. The modulator 22A-1 functions as an example of a modulator and a second modulator. The demodulator 22A-2 functions as an example of a demodulator and a first demodulator.

FIG. 3 is a diagram illustrating an example of signal standards of the control signal and the response signal.

A communication method of the control signal and the response signal is a half-duplex communication method. Therefore, when the transmitting device 1 transmits the control signal to the receiving device 2, for example, the receiving device 2 cannot transmit the response signal to the transmitting device 1. A synchronous method of the control signal and the response signal is a start-stop synchronous method. Whenever the microcomputer 13 transmits the control signal or the microcomputer 22 transmits the response signal, a signal (start bit) indicative of the transmission start and a signal (stop bit) indicative of the transmission end are added to the control signal or response signal. A modulation method of the control signal and the response signal is a frequency modulation method. As described above, the modulator 17 modulates the control signal and the modulator 23 modulates the response signal. The transmission speed of the control signal and the response signal is 1200 bps. When the line frequency of the control signal and the response signal illustrates "1 (mark)", it is 1300 Hz. When the line frequency of the control signal and the response signal illustrates "0 (space)", it is 2100 Hz.

Figure 4A:
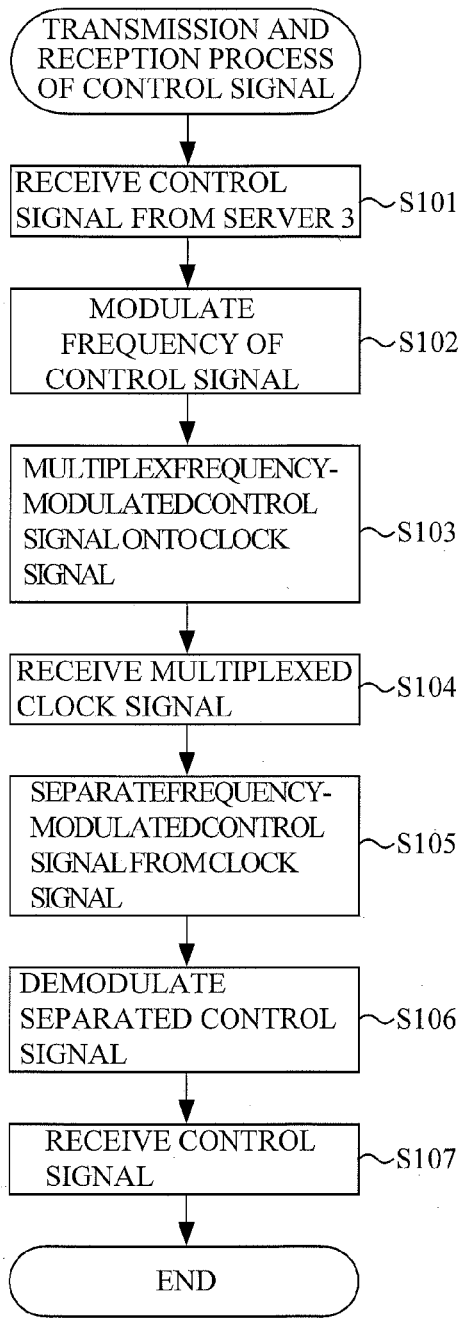
FIG. 4A is a flowchart illustrating a transmission and reception process of the control signal.
Figure 4B:
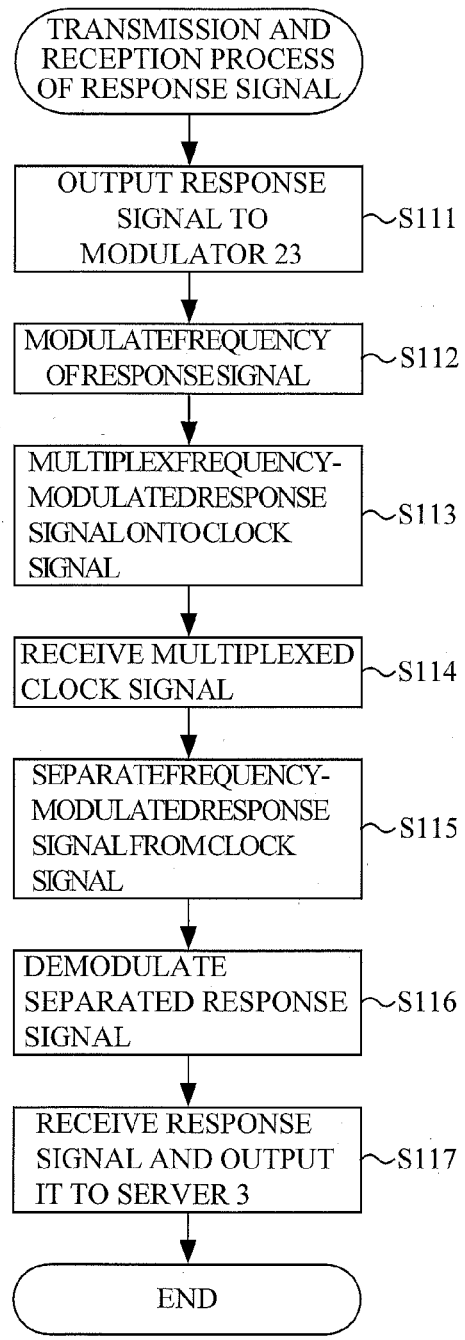
FIG. 4B is a flowchart illustrating a transmission and reception process of the response signal.

FIG. 4A is a flowchart illustrating a transmission and reception process of the control signal. FIG. 4B is a flowchart illustrating a transmission and reception process of the response signal.

In FIG. 4A, the microcomputer 13 receives the control signal from the server 3 (step S101). The modulator 17 modulates the frequency of the control signal. (step S102). The differential driver 18 multiplexes the frequency-modulated control signal onto the clock signal to be transmitted to the receiving device 2 via the Cat5 cable 4 (step S103). Then, the differential receiver 25 receives the clock signal onto which the frequency-modulated control signal is multiplexed (step S104). The filter 26 separates the frequency-modulated control signal from the multiplexed clock signal (step S105). The demodulator 27 demodulates the separated control signal (step S106). The microcomputer 22 receives the control signal (step S107). When the control signal is a command for adjusting luminance or resolution of the monitor 8, the control signal is output to the monitor 8.

In FIG. 4B, the microcomputer 22 outputs the response signal corresponding to the control signal to the modulator 23 (step S111). The modulator 23 modulates the frequency of the response signal (step S112). The differential driver 24 multiplexes the frequency-modulated response signal onto the clock signal to be transmitted to the transmitting device 1 via the Cat5 cable 4 (step S113). Then, the differential receiver 16 of the transmitting device 1 receives the clock signal onto which the frequency-modulated response signal is multiplexed (step S114). The filter 15 separates the frequency-modulated response signal from the multiplexed clock signal (step S115). The demodulator 14 demodulates the separated response signal (step S116). The microcomputer 13 receives the response signal, and outputs the response signal to the server 3 (step S117).

Figure 5:
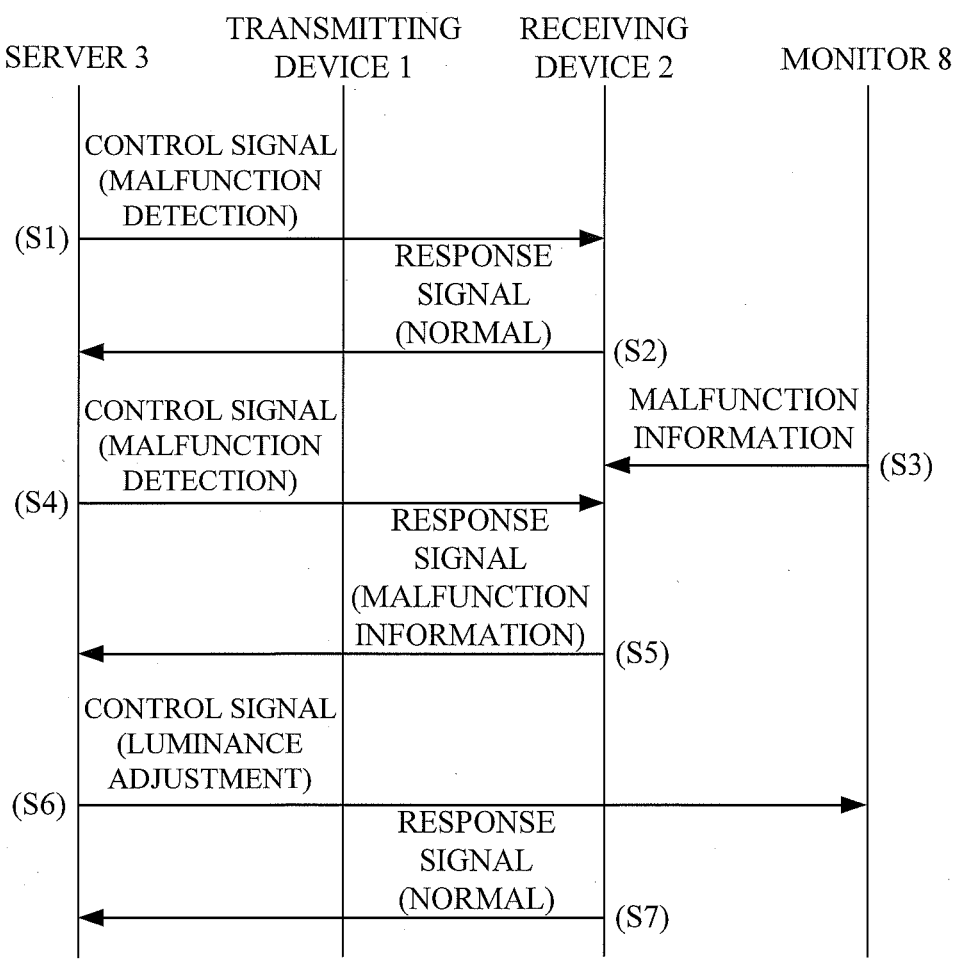
FIG. 5 is a diagram illustrating an example of control sequence of a signal transmission system 100.

FIG. 5 is a diagram illustrating an example of control sequence of the signal transmission system 100.

The server 3 transmits a control signal as a command for detecting the malfunction of the monitor 8, to the receiving device 2 via the transmitting device 1 (S1). When the receiving device 2 does not receive malfunction information from the monitor 8, the receiving device 2 replies a response signal indicating that the monitor 8 is normal, to the server 3 via the transmitting device 1 (S2). It should be noted that address information of the destination is added to the control signal and the response signal. When the control signal is transmitted to the receiving device 2, for example, the address information of the receiving device 2 is added to the control signal.

On the contrary, after the monitor 8 notifies the receiving device 2 of the malfunction information (S3), the server 3 transmits the control signal as the command for detecting the malfunction of the monitor 8, to the receiving device 2 via the transmitting device 1 (S4). Then, the receiving device 2 replies a response signal indicating the malfunction of the monitor 8 to the server 3 via the transmitting device 1 (S5).

In addition, the server 3 transmits the control signal as the command for adjusting the luminance of the monitor 8 to the monitor 8 via the transmitting device 1 and the receiving device 2 (S6). After the control signal as the command for adjusting the luminance of the monitor 8 is transmitted to the monitor 8, the receiving device 2 replies the response signal indicating that the monitor 8 is normal, to the server 3 via the transmitting device 1 (S7).

As described above, according to the signal transmission system of the present embodiment, the transmitting device 1 modulates the frequency of the control signal, and multiplexes the frequency-modulated control signal onto the DVI signal to be transmitted to the receiving device 2 via the Cat5 cable 4. Then, the receiving device 2 separates the frequency-modulated control signal from the multiplexed DVI signal, and demodulates the separated control signal. Therefore, the transmitting device 1 can transmit the DVI signal and the control signal to the receiving device 2 using a single network cable. In addition, the transmitting device 1 can multiplex the control signal onto the DVI signal, without caring about the signal speed and the resolution of the DVI signal. Moreover, since the control signal is multiplexed onto the DVI signal which is the differential signal, the control signal is less affected by a common mode noise.

The receiving device 2 modulates the frequency of the response signal corresponding to the control signal, and multiplexes the frequency-modulated response signal onto the DVI signal to be transmitted to the transmitting device 1 via the Cat5 cable 4. Then, the transmitting device 1 separates the frequency-modulated response signal from the multiplexed DVI signal, and demodulates the separated response signal. Therefore, the control signal is transmitted from the transmitting device 1 to the receiving device 2, and the response signal corresponding to the control signal is transmitted from the receiving device 2 to the transmitting device 1. Thus, the interactive transmission of the control signal and the response signal corresponding to this is attained.

(Second Embodiment) In the first embodiment, the signal transmission system 100 includes the single transmitting device and the single receiving device. In a second embodiment, a signal transmission system 101 includes the single transmitting device and a plurality of receiving devices. It should be noted that component elements corresponding to those indicated in the first embodiment are designated by identical reference numerals. The signal standards of the control signal and the response signal is identical with the signal standards of FIG. 3.

Figure 6:
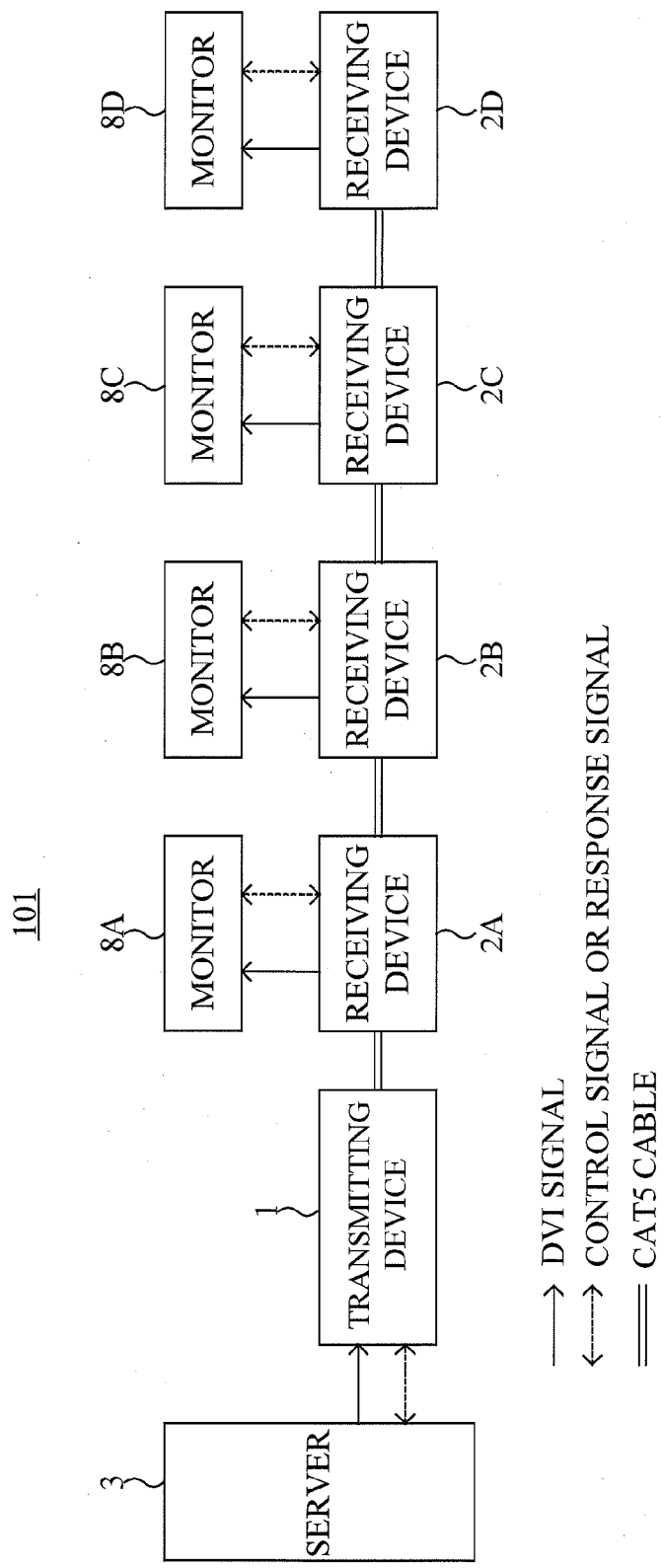
FIG. 6 is a schematic diagram illustrating the construction of a signal transmission system according to a second embodiment.

FIG. 6 is a schematic diagram illustrating the construction of a signal transmission system according to the second embodiment.

A signal transmission system 101 includes the transmitting device 1, receiving devices 2A to 2D, and the server 3. The transmitting device 1 is connected to the receiving device 2A via the Cat5 cable 4. A plurality of Cat5 cables 4 are connected between the receiving devices 2A and 2B, between the receiving devices 2B and 2C, and between the receiving devices 2C and 2D, respectively. Monitors 8A to 8D are connected to the receiving devices 2A to 2D, respectively. The second embodiment is different from the first embodiment in that the receiving devices 2A to 2C relays the DVI signal, the control signal and the response signal. That is, in the first embodiment, the receiving device 2 does not relay the DVI signal, the control signal and the response signal to other receiving device. However, in the second embodiment, the receiving devices 2A to 2C relay the DVI signal, the control signal and the response signal to other receiving devices. Thereby, the DVI signal. output from the server 3 is displayed on the monitors 8A to 8D as images, for example. For example, the control signal output from the server 3 to the receiving device 2B is relayed by the receiving device 2A and transmitted to the receiving device 2B.

Figure 7A:
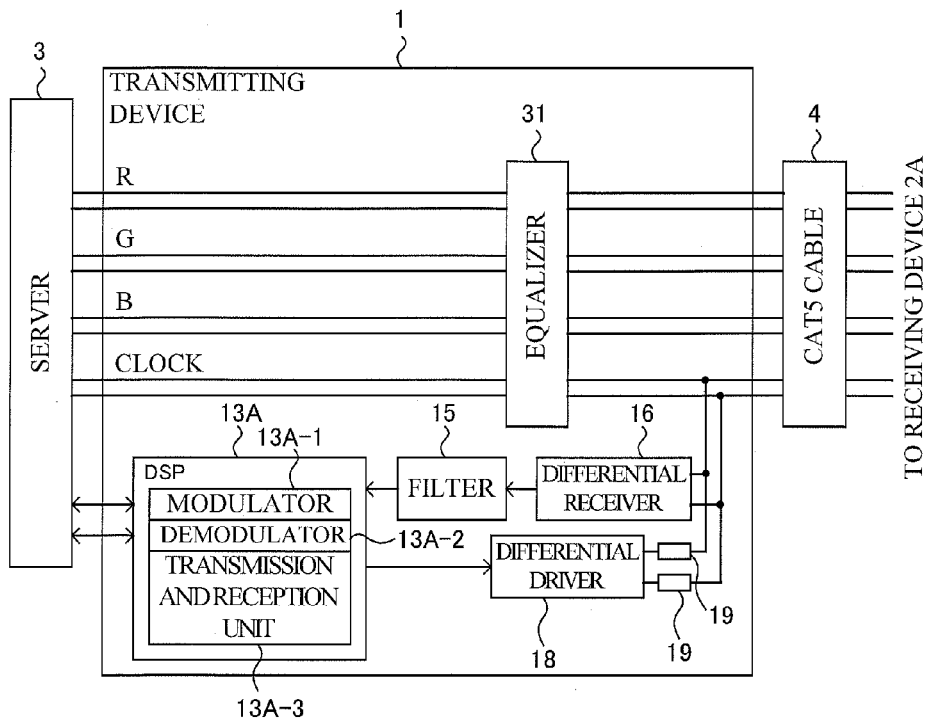
FIG. 7A is a diagram illustrating an example of the schematic construction of a transmitting device 1.
Figure 7B:
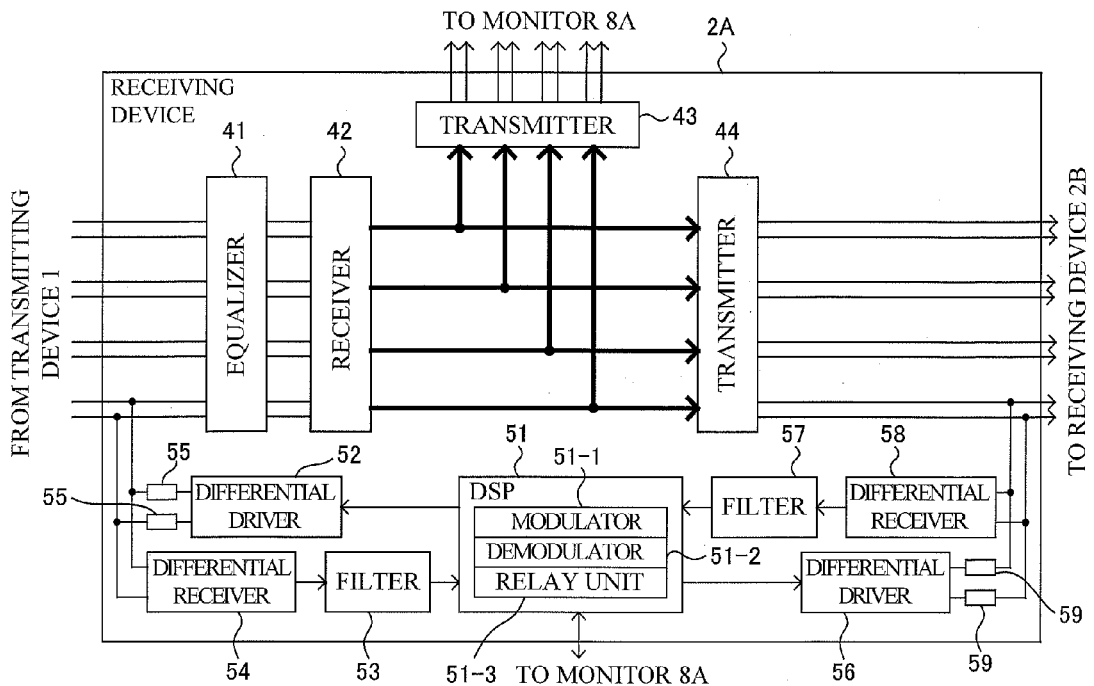
FIG. 7B is a diagram illustrating an example of the schematic construction of a receiving device 2A.

FIG. 7A is a diagram illustrating an example of the schematic construction of the transmitting device 1. FIG. 7B is a diagram illustrating an example of the schematic construction of the receiving device 2A. The construction of the receiving devices 2B to 2D is identical with that of the receiving device 2A, and therefore a description thereof is omitted.

In FIG. 7A, the transmitting device 1 includes the DSP 13A, the filter 15, the differential receiver 16, the differential driver 18, the terminators 19, and an equalizer 31. The DSP 13A includes the modulator 13A-1 that modulates the control signal, the demodulator 13A-2 that demodulates the response signal, and the transmission and reception unit 13A-3 that transmits and receives the control signal and the response signal. The differential receiver 16 receives the clock signal onto which the response signal is multiplexed, from the receiving devices 2A to 2D. The filter 15 is a low pass filer and separates the response signal from the clock signal. The differential driver 18 multiplexes the frequency-modulated control signal onto the clock signal (i.e., performs frequency-division multiplexing), and transmits the multiplexed control signal to the receiving devices 2A to 2D. Each of the terminators 19 is composed of a resistance, prevents reflection of the control signal output from the differential driver 18, and hence prevents disorder of the signal. The equalizer 31 compensates the loss (attenuation) of the DVI signal from the server 3, and outputs the DVI signal to the receiving devices 2A to 2D.

In FIG. 7B, the receiving device 2A includes an equalizer 41, a receiver 42, a transmitters 43 and 44, a DSP 51, a differential driver 52, a filter 53, a differential receiver 54, terminators 55, a differential driver 56, a filter 57, a differential receiver 58, and terminators 59.

The equalizer 41 receives the DVI signal from the transmitting device 1, compensates the loss (attenuation) of the received DVI signal, and outputs the DVI signal to the receiver 42. The receiver 42 performs serial-parallel conversion to the DVI signal, and transmits the DVI signal converted into the parallel signal to the transmitters 43 and 44. The transmitter 43 performs parallel-serial conversion to the DVI signal converted into the parallel signal, and outputs the DVI signal converted into the serial signal to the monitor 8A. The transmitter 44 performs the parallel-serial conversion to the DVI signal converted into the parallel signal, and transmits the DVI signal converted into the serial signal to a next receiving device (here, the receiving device 2B). It should be noted that the receiver 42 and the transmitter 44 relay the DVI signal in order to transmit the DVI signal to the next receiving device.

The differential driver 52 multiplexes the frequency-modulated response signal onto the clock signal, and transmits the multiplexed clock signal to the transmitting device 1. Each of the terminators 55 is composed of a resistance, prevents reflection of the control signal output from the differential driver 52, and hence prevents disorder of the signal. The differential receiver 54 receives the clock signal onto which the control signal is multiplexed, from the transmitting device 1. The filter 53 is a low pass filer, separates the control signal from the clock signal, and outputs the separated control signal to the DSP 51.

The DSP 51 includes a modulator 51-1 that modulates the control signal, the demodulator 51-2 that demodulates the response signal, and a relay unit 51-3 that relays the control signal and the response signal. The modulator 51-1 functions as an example of a modulator and a second modulator. The demodulator 51-2 functions as an example of a demodulator and a first demodulator.

The relay unit 51-3 determines whether a destination of the control signal is the receiving device 2A, based on address information added to the control signal. When the destination of the control signal is the receiving device 2A, the relay unit 51-3 performs a given process according to the content of the control signal. For example, when the control signal is a command to detect the malfunction of the monitor 8A, the relay unit 51-3 determines whether it has received malfunction information from the monitor 8A. When the relay unit 51-3 has received the malfunction information from the monitor 8A, the relay unit 51-3 outputs a response signal indicative of the malfunction of the monitor 8A to the differential driver 52. The differential driver 52 multiplexes the response signal indicative of the malfunction of the monitor 8A onto the clock signal, and replies the multiplexed clock signal to the transmitting device 1. When the relay unit 51-3 has not received the malfunction information from the monitor 8A, the relay unit 51-3 outputs a response signal indicating that the monitor 8A is normal, to the differential driver 52. The differential driver 52 multiplexes the response signal indicating that the monitor 8A is normal onto the clock signal, and replies the multiplexed clock signal to the transmitting device 1.

For example, when the control signal is a command to adjust the luminance of the monitor 8A, the relay unit 51-3 outputs the command to adjust the luminance of the monitor 8A, to the monitor 8A. On the other hand, when the control signal is not the command to adjust the luminance of the monitor 8A (e.g. the control signal is a command to adjust the luminance of any one of the monitors 8B to 8D), the relay unit 51-3 outputs the control signal to the differential driver 56. That is, the relay unit 51-3 relays the control signal.

The differential driver 56 multiplexes the frequency-modulated control signal onto the clock signal (i.e., performs frequency-division multiplexing), and transmits the multiplexed clock signal to the receiving device 2B. Each of the terminators 59 is composed of a resistance, prevents reflection of the control signal output from the differential driver 56, and hence prevents disorder of the signal. The differential receiver 58 receives the clock signal onto which the response signal is multiplexed, from the receiving device 2B. The filter 57 is a low pass filer, separates the response signal from the clock signal, and outputs the separated response signal to the DSP 51.

Figure 8A:
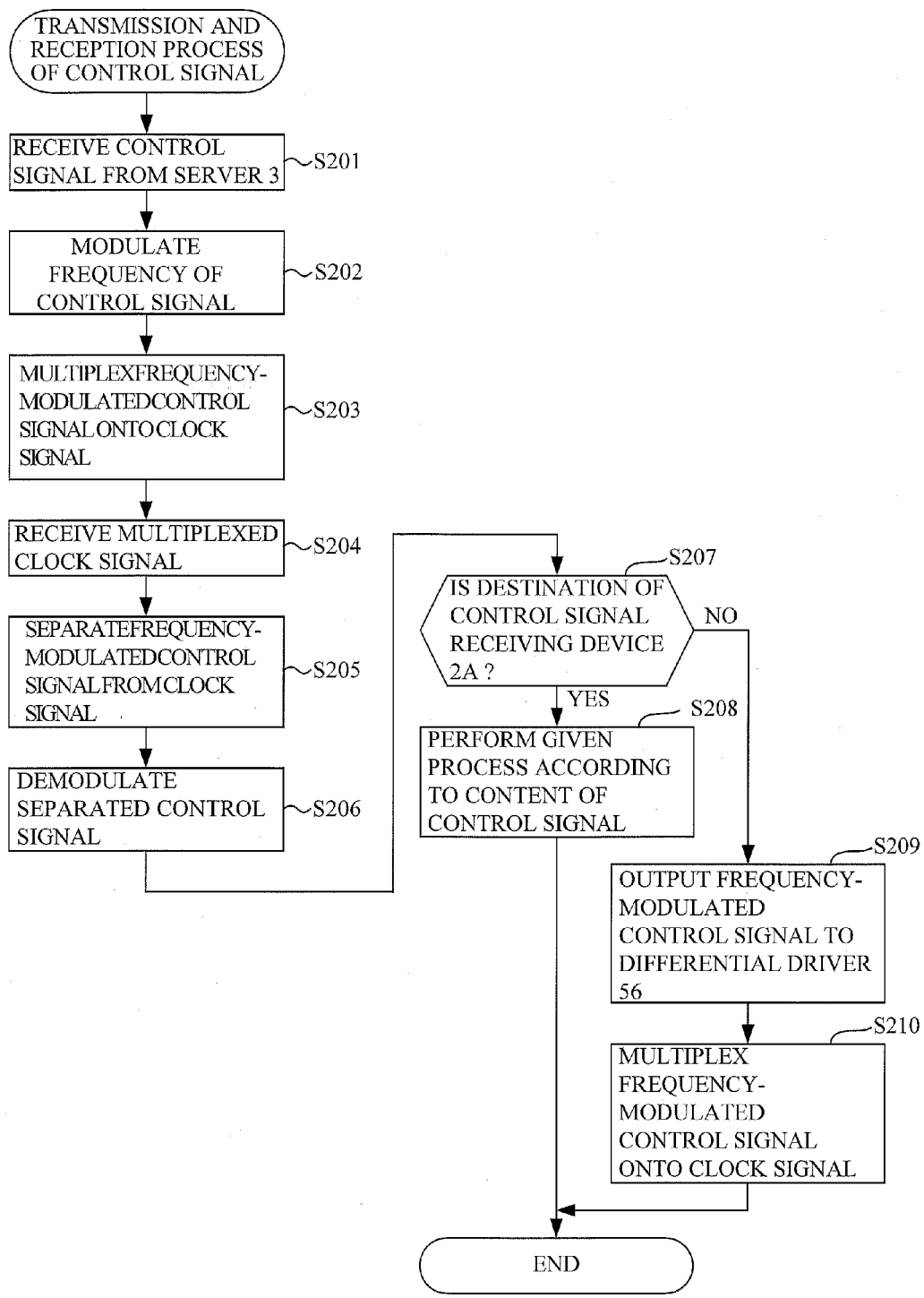
FIG. 8A is a flowchart illustrating a transmission and reception process of the control signal.
Figure 8B:
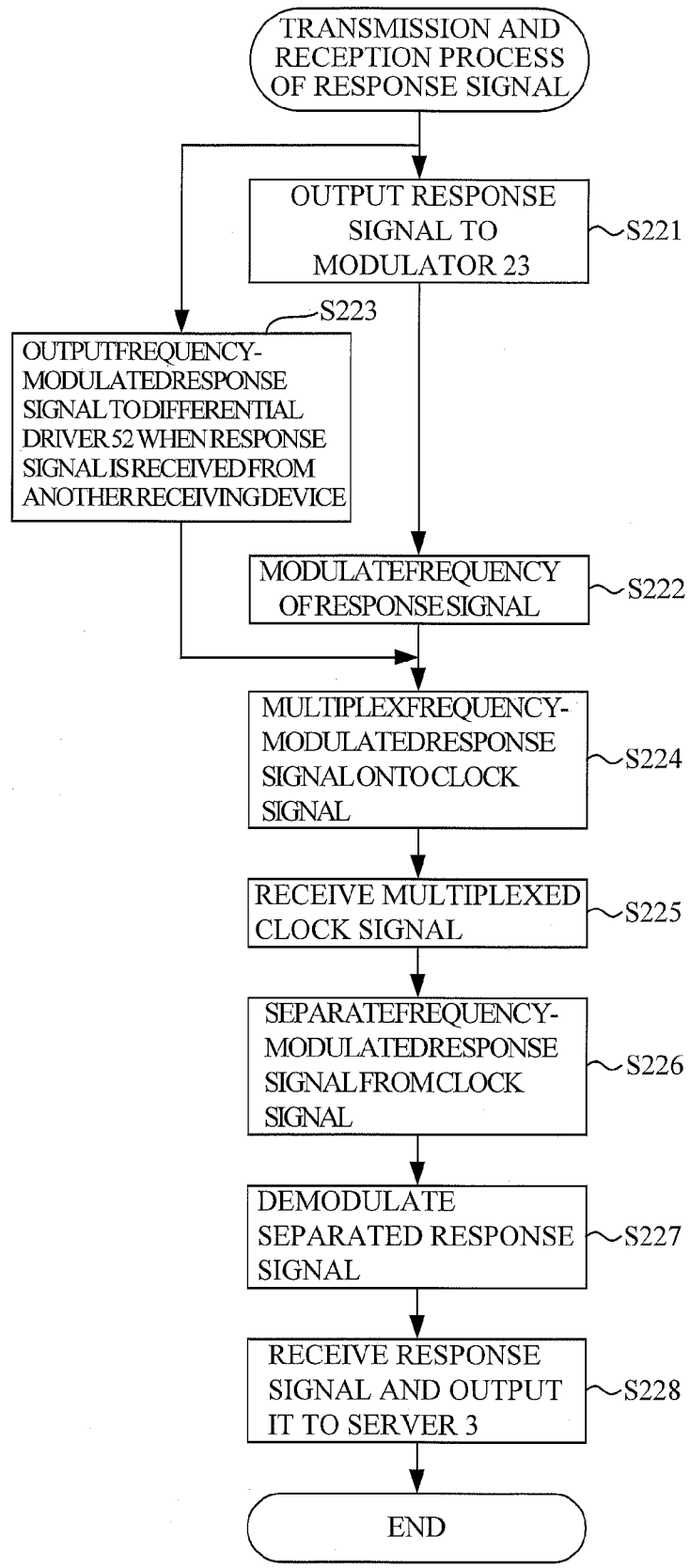
FIG. 8B is a flowchart illustrating a transmission and reception process of the response signal.

FIG. 8A is a flowchart illustrating a transmission and reception process of the control signal. FIG. 8B is a flowchart illustrating a transmission and reception process of the response signal.

In FIG. 8A, the DSP 13A receives the control signal from the server 3 (step S201). The modulator 13A-1 modulates the frequency of the control signal (step S202). The differential driver 18 multiplexes the frequency-modulated control signal onto the clock signal to be transmitted to any one of the receiving devices 2A to 2D via the Cat5 cable 4 (step S203). Then, the differential receiver 54 of the receiving device 2A receives the clock signal onto which the frequency-modulated control signal is multiplexed (step S204). The filter 53 separates the frequency-modulated control signal from the multiplexed clock signal (step S205). The demodulator 51-2 of the DSP 51 demodulates the separated control signal (step S206).

The relay unit 51-3 determines whether a destination of the control signal is the receiving device 2A, based on address information added to the control signal (step S207). When the destination of the control signal is the receiving device 2A (YES in step S207), the relay unit 51-3 performs a given process according to the content of the control signal, as described above (step S208). On the other hand, when the destination of the control signal is not the receiving device 2A (NO in step S207), the relay unit 51-3 outputs the frequency-modulated control signal received from the filter 53, to the differential driver 56 (step S209). The differential driver 56 multiplexes the frequency-modulated control signal onto the clock signal to be transmitted to the receiving device 2B via the Cat5 cable 4 (step S210). As is the case with the receiving device 2A, the receiving devices 2B to 2D perform the above-mentioned steps 5204 to 5210.

In FIG. 8B, the relay unit 51-3 outputs the response signal corresponding to the control signal to the modulator 51-1 (step S221). The modulator 51-1 modulates the frequency of the response signal (step S222). On the contrary, when the DSP 51 receives the frequency-modulated response signal via the filter 57 and the differential receiver 58, the relay unit 51-3 outputs the frequency-modulated response signal to the differential driver 52 (step S223).

The differential driver 52 multiplexes the frequency-modulated response signal onto the clock signal to be transmitted to the transmitting device 1 via the Cat5 cable 4 (step S224). The differential receiver 16 of the transmitting device 1 receives the clock signal onto which the frequency-modulated response signal is multiplexed (step S225). The filter 15 separates the frequency-modulated response signal from the multiplexed clock signal (step S226). The demodulator 13A-2 demodulates the separated response signal (step S227). The transmission and reception unit 13A-3 receives the response signal, and outputs the response signal to the server 3 (step S228).

Figure 9:
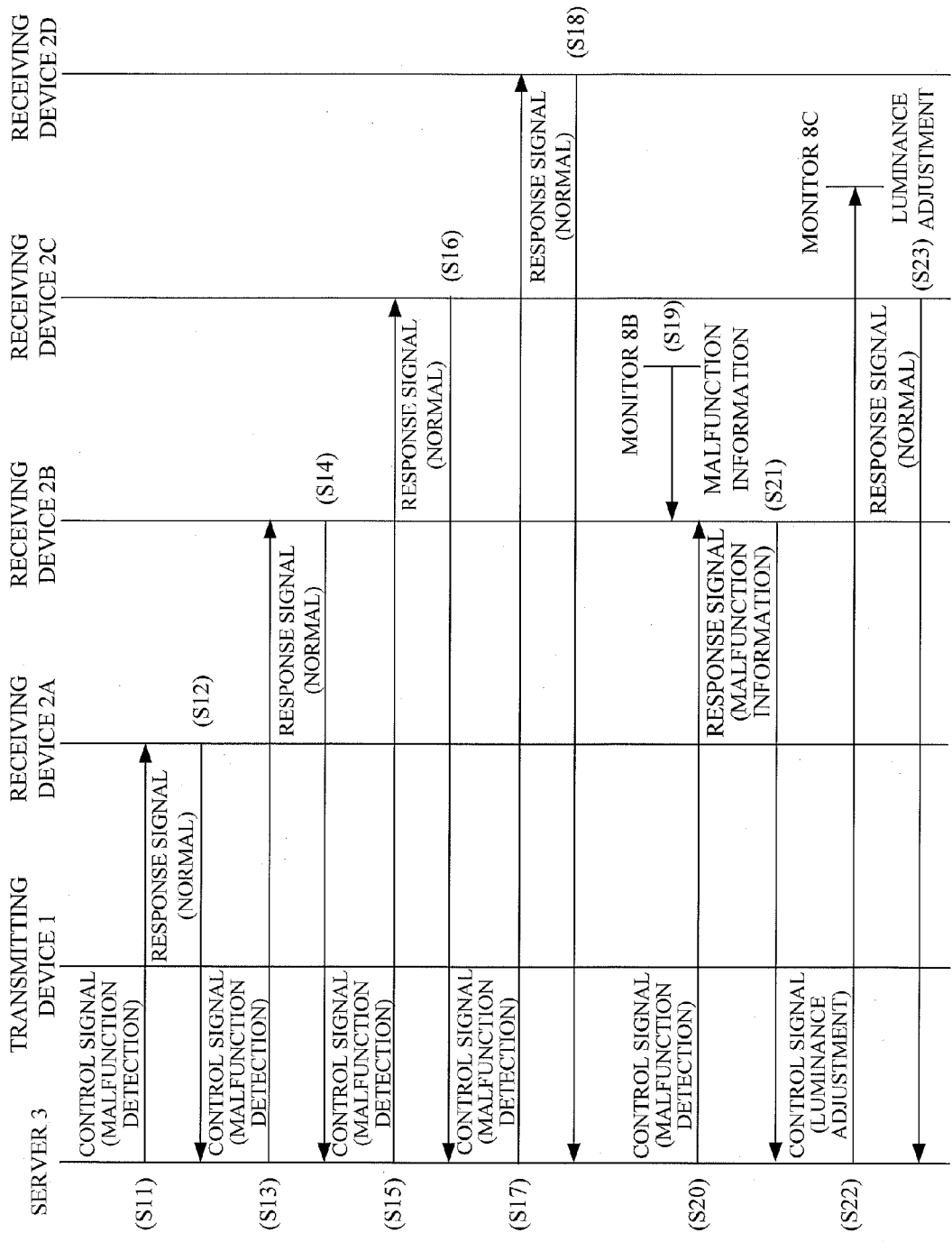
FIG. 9 is a diagram illustrating an example of control sequence of a signal transmission system 101.

FIG. 9 is a diagram illustrating an example of control sequence of a signal transmission system 101.

First, the server 3 transmits the control signal as a command to detect the malfunction of the monitor 8, to the receiving device 2A via the transmitting device 1 (S11). When the receiving device 2A does not receive the malfunction information from the monitor 8, the receiving device 2A replies the response signal indicating that the monitor 8 is normal, to the server 3 via the transmitting device 1 (S12). It should be noted that the address information indicative of the destination is added to the control signal and the response signal. For example, when the control signal is transmitted to the receiving device 2A, the address information of the receiving device 2A is added to the control signal.

Similarly, the server 3 transmits in order the control signals as the commands to detect the malfunction of the monitors 8A to 8D, to the receiving devices 2B to 2D via the transmitting device 1 (S13, S15, S17). When the receiving devices 2B to 2D have not received malfunction information from the monitors 8B to 8D, respectively, the receiving devices 2B to 2D reply the response signals indicating that the monitors 8B to 8D are normal, to the server 3 via the transmitting device 1 (S14, S16, S18).

For example, after the monitor 8B notifies the receiving device 2B of the malfunction information (S19), the server 3 transmits the control signal as the command to detect the malfunction of the monitors 8B, to the receiving device 2B via the transmitting device 1 and the receiving device 2A (S20). Then, the receiving device 2B replies the response signal indicative of the malfunction of the monitors 8B to the server 3 via the transmitting device 1 and the receiving device 2A (S21). At this time, the DSP 51 of the receiving device 2A relays the control signal and the response signal.

For example, the server 3 transmits the control signal as the command to adjust the luminance of the monitor 8C, to the monitor 8C via the transmitting device 1 and the receiving devices 2A to 2C (S22). After the receiving device 2C transmits the control signal as the command to adjust the luminance of the monitor 8C, to the monitor 8C, the receiving device 2C replies the response signal indicating that the luminance of the monitor 8C is normal, to the server 3 via the transmitting device 1 and the receiving devices 2A and 2B (S23).

As described above, according to the signal transmission system of the present embodiment, when the destination of the control signal is another receiving device, the receiving device includes the relay unit 51-3 that relays the control signal to the another receiving device. Therefore, even when the signal transmission system includes the plurality of receiving devices, the control signal can be transmitted to a desired receiving device.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A signal transmission system including a transmitting device and a receiving device, the transmitting device transmitting a Digital Visual Interface (DVI) signal including plural signals, the signal transmission system comprising:
   the transmitting device including:
      a first modulator that frequency-modulates a control signal to be transmitted to the receiving device; and
      a first multiplexer that multiplexes the frequency-modulated control signal onto one of the signals included in the DVI signal to be transmitted to the receiving device via a single network cable; and
   the receiving device including:
      a first separator that separates the frequency-modulated control signal from the signal onto which the frequency-modulated control signal is multiplexed; and
      a first demodulator that demodulates the separated control signal,
   wherein the first modulator frequency-modulates the control signal to be transmitted to the receiving device before multiplexing the control signal onto one of the signals included in the DVI signal.

2. The signal transmission system as claimed in claim 1, wherein
   the receiving device includes:
      a second modulator that frequency-modulates a response signal to be transmitted to the transmitting device and corresponding to the control signal; and
      a second multiplexer that multiplexes the frequency-modulated response signal onto one of the signals included in the DVI signal to be transmitted to the transmitting device via the single network cable; and
   the transmitting device includes:
      a second separator that separates the frequency-modulated response signal from the signal onto which the frequency-modulated response signal is multiplexed; and
      a second demodulator that demodulates the separated response signal.

3. The signal transmission system as claimed in claim 2, wherein the first multiplexer multiplexes the frequency-modulated control signal onto a clock signal included in the DVI signal, and the second multiplexer multiplexes the frequency-modulated response signal onto a clock signal included in the DVI signal.

4. The signal transmission system as claimed in claim 1, wherein the receiving device includes a relay that relays the control signal to another receiving device when a destination of the control signal is the another receiving device.

5. The signal transmission system as claimed in claim 1, wherein the control signal indicates a command to detect malfunction of a display device connected to the receiving device, or a command to adjust luminance or resolution of the display device.

6. The signal transmission system as claimed in claim 1, wherein the first multiplexer multiplexes the frequency-modulated control signal onto a clock signal included in the DVI signal.

7. A signal transmission method, comprising:
   frequency-modulating, by a transmitting device, a control signal;
   multiplexing, by the transmitting device, the frequency-modulated control signal onto one or plural signals included in a DVI (Digital Visual Interface) signal to be transmitted from the transmitting device to a receiving device via a single network cable;

separating, by the receiving device, the frequency-modulated control signal from the multiplexed DVI signal; and demodulating, by the receiving device, the separated control signal, wherein the frequency-modulating is performed before the multiplexing.

8. The signal transmission method as claimed in claim 7, further comprising:

frequency-modulating, by the receiving device, a response signal to be transmitted to the transmitting device and corresponding to the control signal;

multiplexing, by the receiving device, the frequency-modulated response signal onto one of the signals included in the DVI signal to be transmitted to the transmitting device from the receiving device via the single network cable;

separating, by the transmitting device, the frequency-modulated response signal from the multiplexed DVI signal; and demodulating, by the transmitting device, the separated response signal.

9. A transmitting device comprising:

a modulator that frequency-modulates a control signal to be transmitted to a receiving device;

a multiplexer that multiplexes the frequency-modulated control signal onto one of plural signals included in a DVI (Digital Visual Interface) signal to be transmitted to the receiving device via a single network cable;

a separator that separates a frequency-modulated response signal corresponding to the control signal received from the receiving device from a signal onto which the frequency-modulated response signal is multiplexed by the receiving device; and a demodulator that demodulates the separated response signal, wherein the modulator frequency-modulates the control signal to be transmitted to the receiving device before multiplexing the control signal onto one of the signals included in the DVI signal.

10. A receiving device comprising:

a modulator that frequency-modulates a response signal to be transmitted to a transmitting device and corresponding to a control signal received from the transmitting device;

a multiplexer that multiplexes the frequency-modulated response signal onto one of plural signals included in a DVI (Digital Visual Interface) signal to be transmitted to the transmitting device via a single network cable;

a separator that separates a frequency-modulated control signal from a signal onto which the frequency-modulated control signal is multiplexed by the transmitting device; and a demodulator that demodulates the separated control signal, wherein the modulator frequency-modulates the response signal to be transmitted to the transmitting device before multiplexing the response signal onto one of the plural signals included in the DVI signal.

* * * * *